US011164404B2

(12) United States Patent
Dudar

(10) Patent No.: US 11,164,404 B2
(45) Date of Patent: Nov. 2, 2021

(54) METHODS AND SYSTEMS FOR DIAGNOSING AN ACTIVE GRILLE SHUTTER SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 775 days.

(21) Appl. No.: 15/910,818

(22) Filed: Mar. 2, 2018

(65) Prior Publication Data

US 2019/0272687 A1    Sep. 5, 2019

(51) Int. Cl.
*G07C 5/08* (2006.01)
*B60K 11/08* (2006.01)
*F01P 5/02* (2006.01)

(52) U.S. Cl.
CPC .......... *G07C 5/0816* (2013.01); *B60K 11/085* (2013.01); *F01P 5/02* (2013.01); *F01P 2025/46* (2013.01); *Y10S 903/903* (2013.01)

(58) Field of Classification Search
CPC .......... B60K 11/08; B60K 11/085; F01P 5/02; G07C 5/0816; G07C 5/0808; B60R 19/52
See application file for complete search history.

(56) References Cited

U.S. PATENT DOCUMENTS

| 6,866,089 | B2 | | 3/2005 | Avila | |
|---|---|---|---|---|---|
| 7,121,368 | B2 | | 10/2006 | MacKelvie | |
| 8,667,931 | B2 | * | 3/2014 | Kerns | F01P 7/10 |
| | | | | | 123/41.05 |
| 9,616,742 | B1 | * | 4/2017 | Uehara | B60K 11/085 |
| 9,616,743 | B1 | * | 4/2017 | Mays | B60W 10/30 |
| 9,670,793 | B2 | | 6/2017 | Zombo | |
| 9,726,067 | B2 | * | 8/2017 | Hakeem | F01M 13/00 |
| 10,364,735 | B2 | * | 7/2019 | Macfarlane | B60K 11/085 |
| 2003/0226966 | A1 | * | 12/2003 | Kormos | H04N 7/18 |
| | | | | | 250/330 |
| 2012/0100790 | A1 | | 4/2012 | Miesterfeld et al. | |
| 2013/0086839 | A1 | * | 4/2013 | Klop | B60K 11/085 |
| | | | | | 49/1 |
| 2013/0338870 | A1 | * | 12/2013 | Farmer | F01P 11/16 |
| | | | | | 701/29.2 |
| 2014/0137815 | A1 | * | 5/2014 | Hemphill | F01P 7/12 |
| | | | | | 123/41.05 |
| 2014/0290599 | A1 | * | 10/2014 | Numata | F01P 7/10 |
| | | | | | 123/41.05 |
| 2015/0149043 | A1 | * | 5/2015 | Macfarlane | B60K 11/085 |
| | | | | | 701/49 |
| 2016/0368366 | A1 | * | 12/2016 | Miller | F01P 7/12 |
| 2017/0050509 | A1 | * | 2/2017 | Aizawa | B60R 19/52 |

(Continued)

FOREIGN PATENT DOCUMENTS

JP    2010025009 A  *  2/2010  .............. F01P 11/10

*Primary Examiner* — Ig T An
(74) *Attorney, Agent, or Firm* — Geoffrey Brumbaugh; McCoy Russell LLP

(57) ABSTRACT

Methods and systems are provided for diagnosing an active grille shutter (AGS) system. In one example, a method may include indicating degradation of an AGS system of a vehicle based on an infrared image information obtained from a camera coupled to the vehicle and adjusting one or more engine operating parameters responsive to the indicating.

20 Claims, 10 Drawing Sheets

(56) References Cited

U.S. PATENT DOCUMENTS

2017/0120743 A1\* 5/2017 Dudar .................. B60K 11/085
2017/0144710 A1\* 5/2017 Frayer ...................... H01Q 1/42
2017/0225560 A1 8/2017 Klop \* cited by examiner

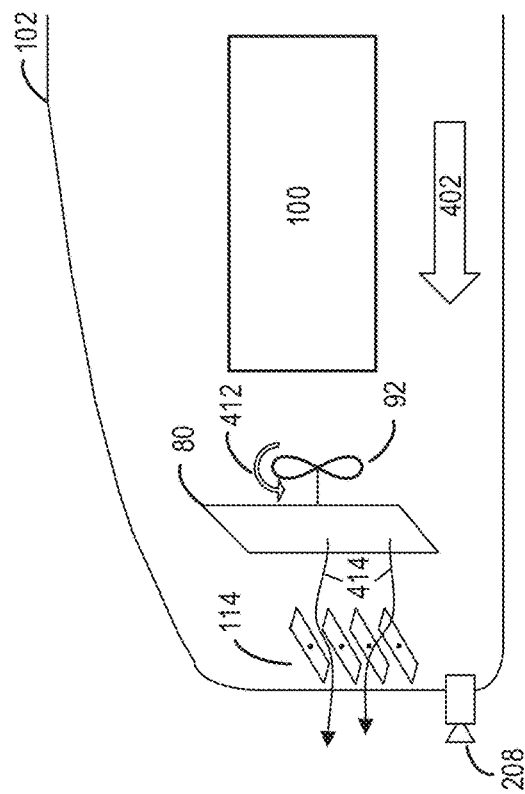
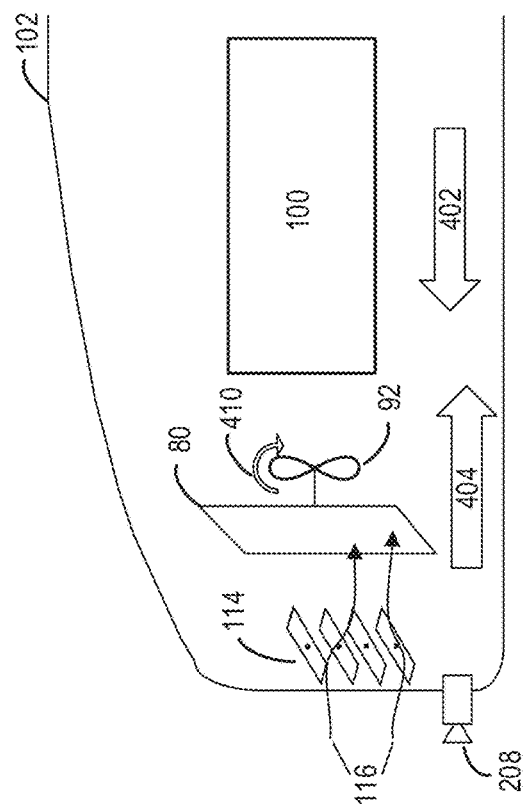

METHODS AND SYSTEMS FOR DIAGNOSING AN ACTIVE GRILLE SHUTTER SYSTEM

FIELD

The present description relates generally to methods and systems for a vehicle, and more specifically to methods and systems for detecting degradation of an active grille shutter system.

BACKGROUND/SUMMARY

Active grille shutters may automatically control airflow through a grille opening to improve operating efficiency. When the grille shutters are open, they allow air to flow through the grille opening and the radiator, and into the engine compartment to promote cooling. When cooling is not required, however, the grille shutters are closed blocking air flow through the grille opening and rerouting the air flow around the vehicle. This reduces aerodynamic drag which reduces fuel consumption and improves the efficiency of the vehicle. Thus, accurate control of grille shutter position may balance engine cooling needs with vehicle efficiency demands.

One example approach for controlling active grille shutter position is shown by Klop in U.S. Patent Application Publication No. 2017/0225560. Therein, active grille shutters may be provided with one or more position sensors to provide feedback to a control module indicating current active grille shutter position. The control module may then command the grille shutters to a desired position based on the position sensor feedback.

However, the inventors herein have recognized potential issues with such systems. As one example, if the one or more position sensors become degraded and stop outputting current shutter position data, the grille shutters may be assumed to be degraded (e.g., not changing position when commanded to do so), even if the grille shutters are functional and able to move as commanded. A false determination of grille shutter degradation may result in degraded fuel economy or limited torque as the system compensates for the assumed lack of active grille shutter functionality.

In one example, the issues described above may be addressed by a method including indicating degradation of an active grille shutter (AGS) system of a vehicle based on an infrared image information obtained from a camera coupled to the vehicle, and adjusting one or more engine operating parameters responsive to the indicating. As one example, the infrared image information may be used to determine a temperature at the front of the vehicle when the active grille shutters are commanded to be closed and/or when the active grille shutters are commanded to be open. If the temperature in front of the vehicle is different than expected and/or does not change upon commanded active grille shutter position adjustment, the AGS system may be determined to be degraded.

In this way, the functionality of the AGS system may be diagnosed independently of any AGS system position sensors or motor current, avoiding false negative determinations AGS system degradation. By relying on infrared image information (via which a temperature at the front of the vehicle may be determined) rather than engine coolant temperature to diagnose the AGS system, for example, variations in engine coolant temperature due to varying engine loads and ambient temperatures (as well as delays associated with the thermal properties of liquid coolant) may be avoided. Further still, the infrared image information may be obtained by a camera that already exists on the vehicle (e.g., for parking assistance, obstacle detection, and/or other functions), avoiding the need for additional costly sensors or controls.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4B schematically show partial views of the vehicle of FIGS. 1-2 including a cooling fan operating in a forward or reverse direction.

DETAILED DESCRIPTION

Figure 5:
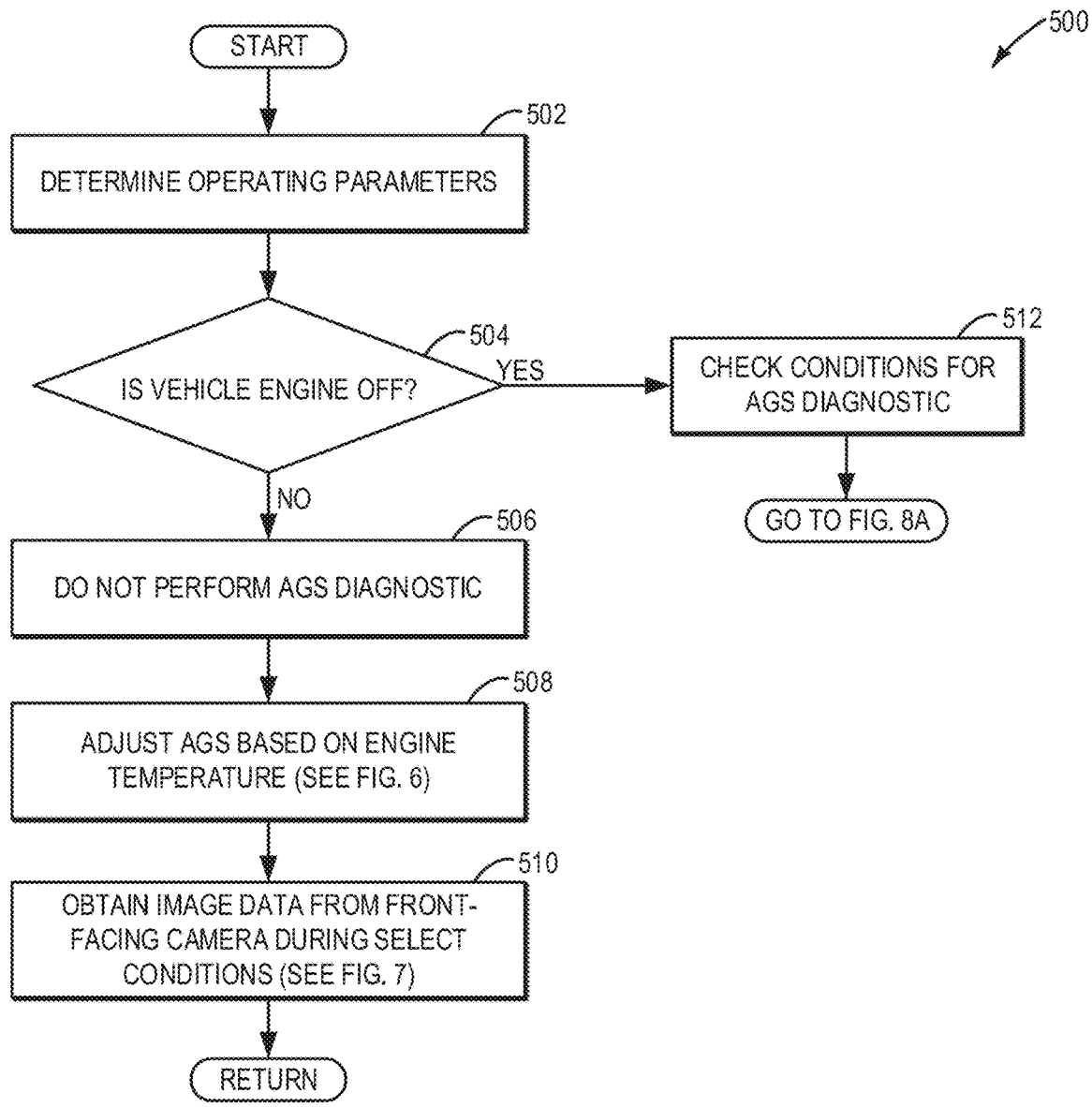
FIG. 5 is a flow chart illustrating a high-level method for operating a vehicle.
Figure 6:
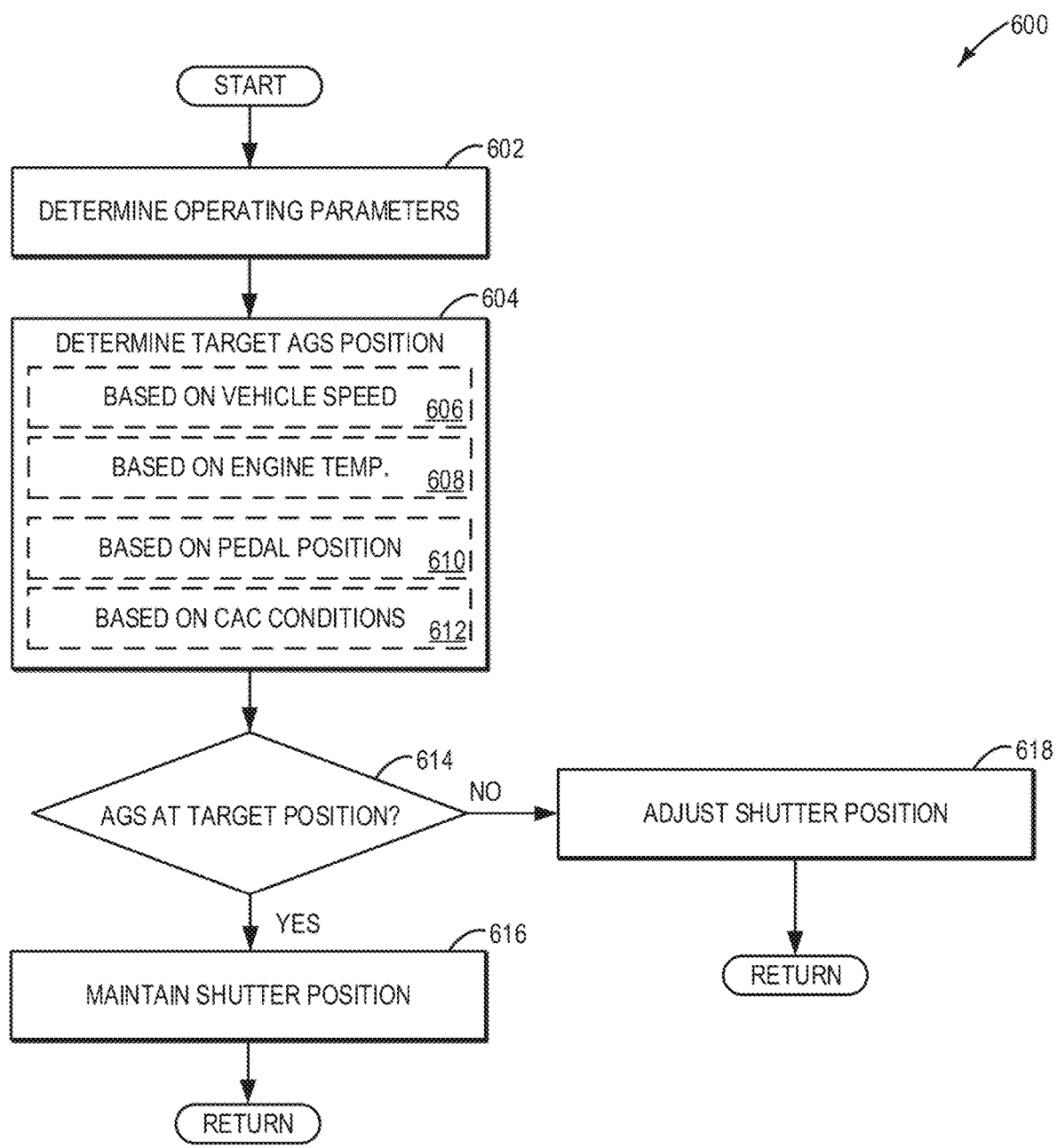
FIG. 6 is a flow chart illustrating a method for adjusting an AGS system.
Figure 7:
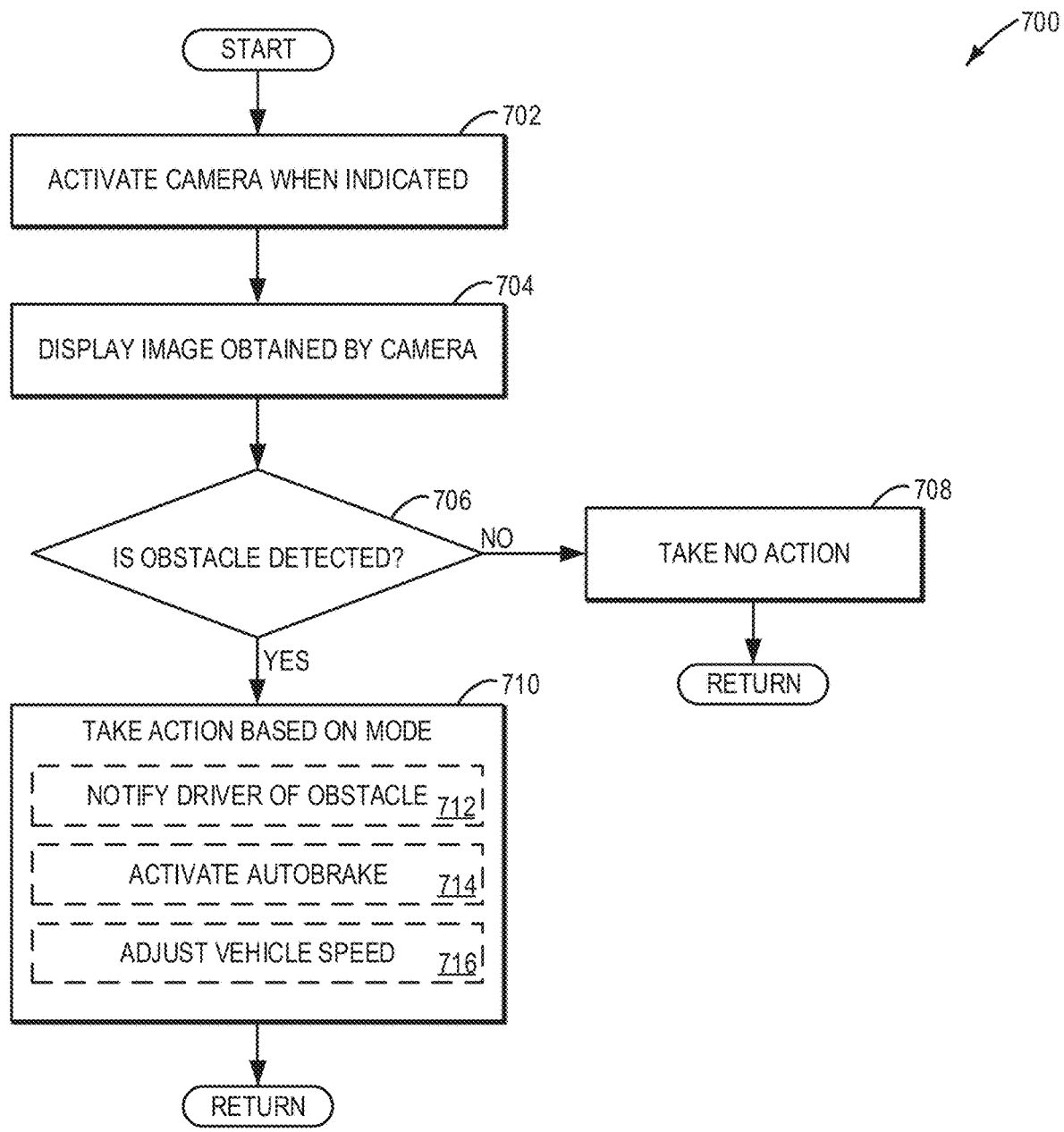
FIG. 7 is a flow chart illustrating a method for operating a forward-facing camera of a vehicle.
Figure 8A:
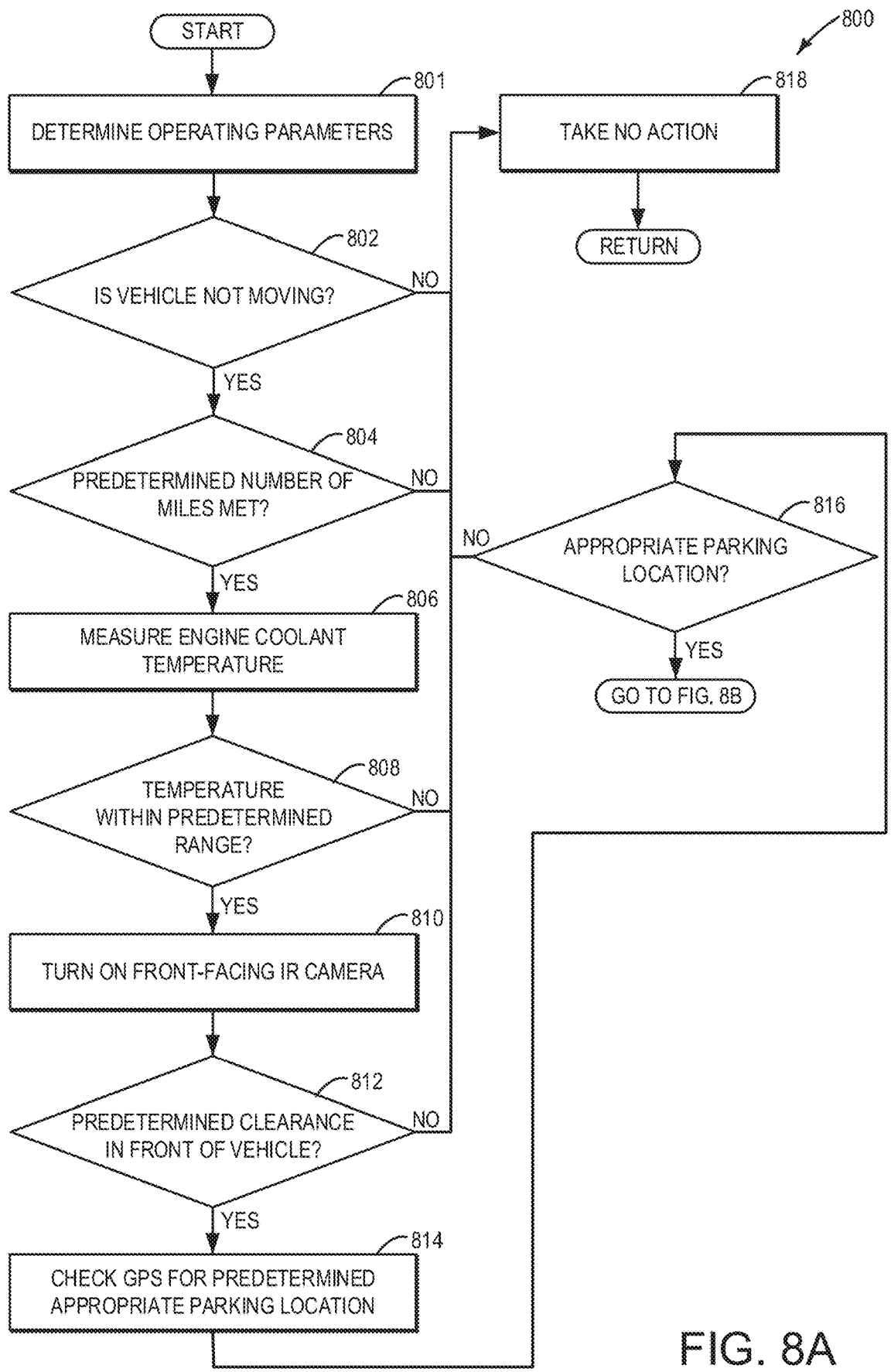
FIGS. 8A-8B are flow charts illustrating a method for an AGS system diagnostic routine.
Figure 8B:
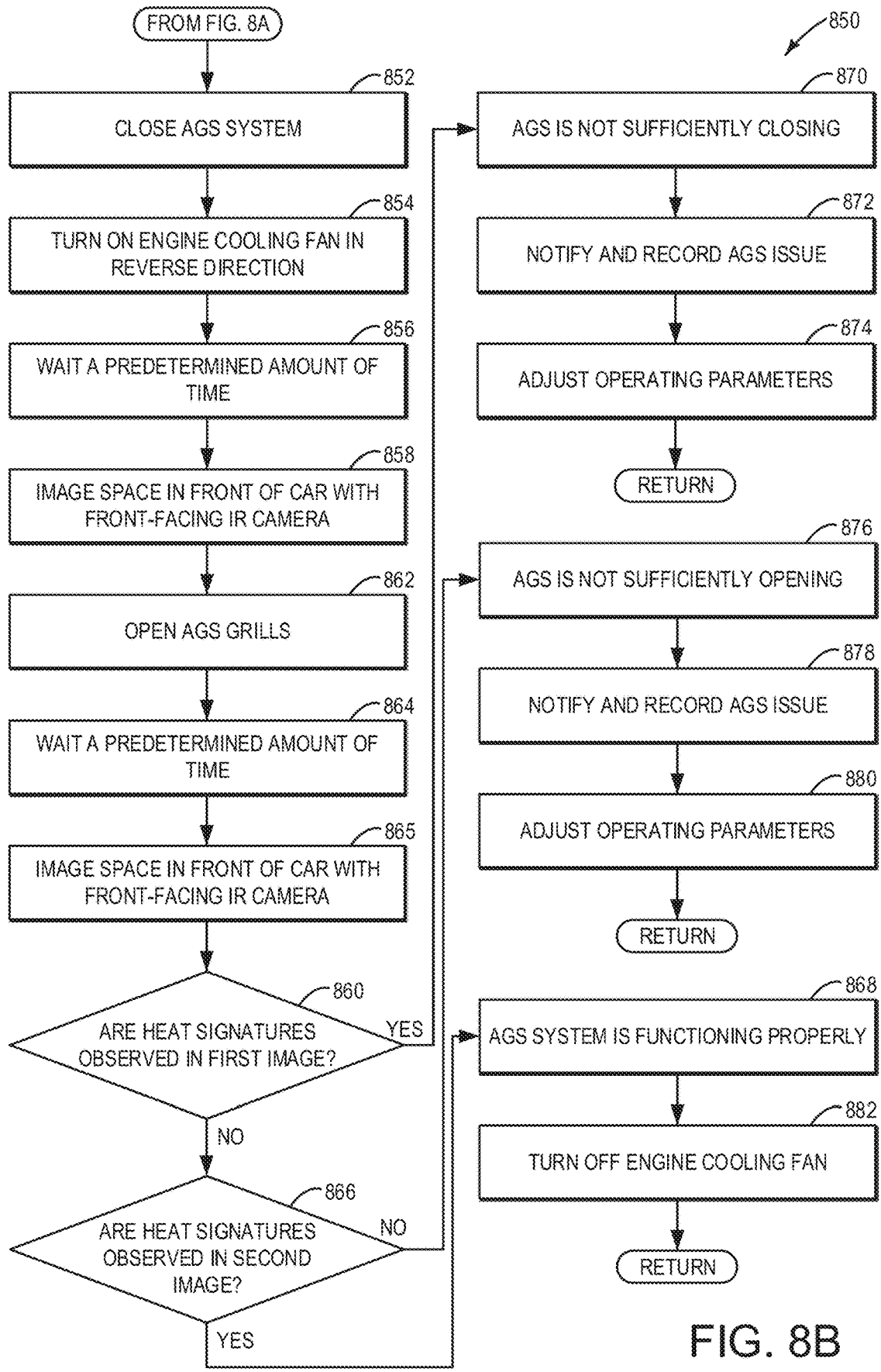
Figure 9:
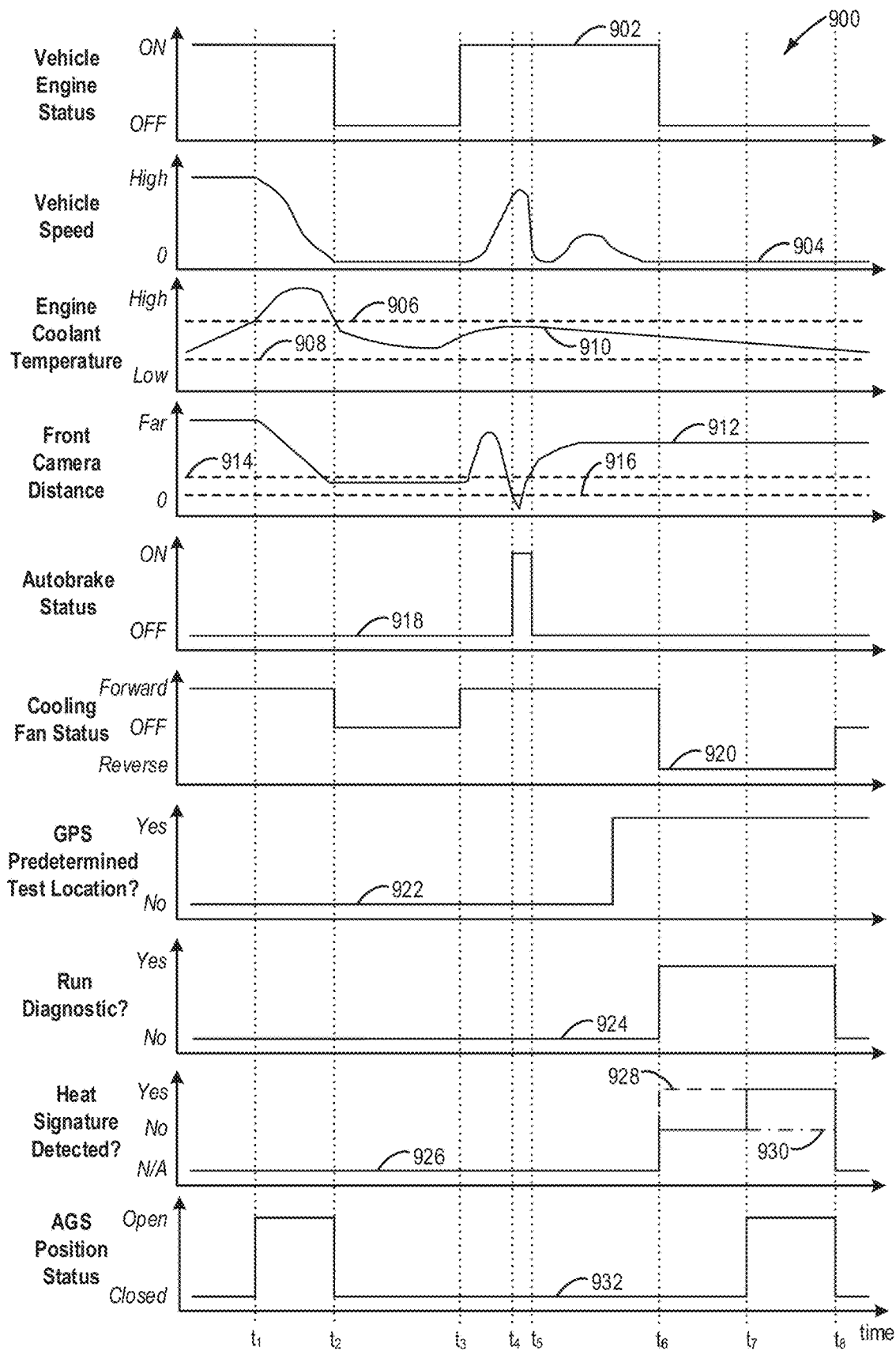
FIG. 9 is a timing diagram showing operating parameters of interest during the execution of the methods of FIGS. 5-8B.

The following description relates to systems and methods for diagnosing an active grille shutter (AGS) system using infrared (IR) image information. The AGS system may be coupled to an engine included in a vehicle, such as the vehicle system shown in FIGS. 1-2, in order to modulate engine cooling and vehicle drag. The IR image information may be obtained from a forward-facing camera on the vehicle, which may output visible light and IR images, as shown in FIGS. 3A-3C. Specifically, the diagnostic may be performed at key-off by running the engine cooling fan the reverse direction, forcing warm air out the front of the vehicle to facilitate IR imaging as shown in FIGS. 4A-4B. A high-level method for operating this vehicle system with an AGS system, a forward-facing camera, and an AGS diagnostic system is shown in FIG. 5. A method for operating and adjusting the AGS system is shown in FIG. 6. A method for using the forward-facing camera system of a vehicle is shown in FIG. 7. A method for determining the entry conditions to perform the AGS diagnostic test, as well as the specific steps in the AGS diagnostic test, is shown in FIGS. 8A-8B. An example timeline for operating a vehicle system according to the routines of FIGS. 5-8B is shown in FIG. 9.

Figure 1:
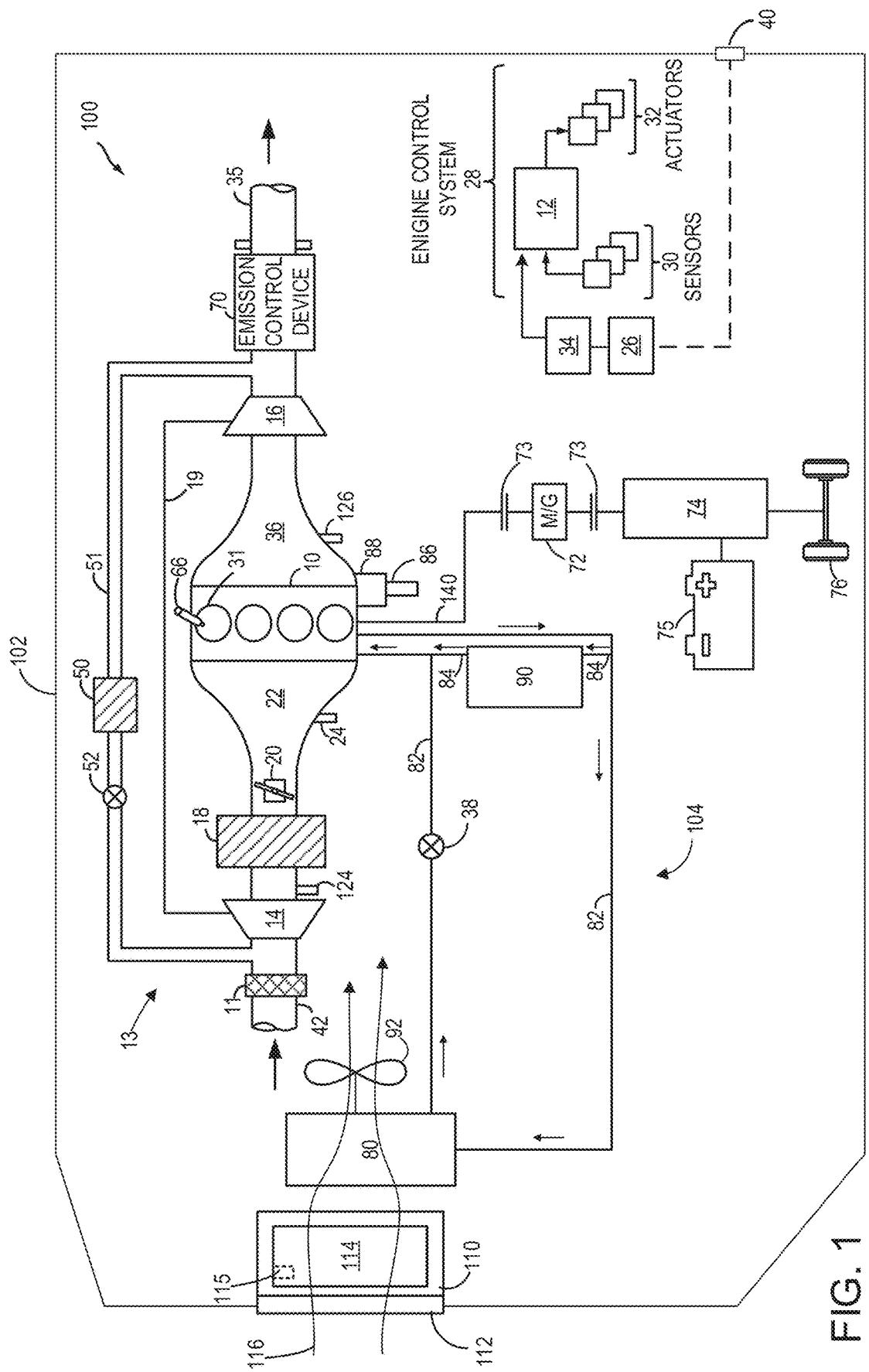
FIGS. 1-2 schematically show an example vehicle including an AGS system.

Turning now to FIG. 1, it shows a schematic of an example vehicle 102, including an engine system 100 and an AGS system 110. Engine system 100 may be included in a vehicle such as a road vehicle, among other types of vehicles. While the example applications of engine system 100 will be described with reference to a vehicle, it will be appreciated that various types of engines and vehicle propulsion systems may be used, including passenger cars, trucks, and the like. Engine system 100 may include a gasoline, a diesel, or another type of internal combustion engine.

In some examples, vehicle 102 may be a hybrid vehicle with multiple sources of torque available to one or more vehicle wheels 76. In other examples, vehicle 102 is a conventional vehicle with only an engine, or an electric vehicle with only electric machine(s). In the example shown, vehicle 102 includes engine 10 and an electric machine 72. Electric machine 72 may be a motor or a motor/generator. Crankshaft 140 of engine 10 and electric machine 72 are connected via a transmission 74 to vehicle wheels 76 when one or more clutches 73 are engaged. In the depicted example, a first clutch 73 is provided between crankshaft 140 and electric machine 72, and a second clutch 73 is provided between electric machine 72 and transmission 74. Controller 12 may send a signal to an actuator of each clutch 73 to engage or disengage the clutch, so as to connect or disconnect crankshaft 140 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

In the embodiment shown, electric machine 72 receives electrical power from a traction battery 75 to provide torque to vehicle wheels 76. Electric machine 72 may also be operated as a generator to provide electrical power to charge battery 75, for example during a braking operation. It will be appreciated that embodiments that include engine 10 without electrical machine 72, traction battery 75 may be replaced by a starting lighting ignition (SLI) battery.

As shown in the example engine system 100 of FIG. 1, engine 10 is a boosted engine coupled to a turbocharger 13 including a compressor 14 driven by a turbine 16. Specifically, fresh air is introduced at intake passage 42 into engine 10 via air cleaner 11 and compressor 14. The compressor may be a suitable intake air compressor, such as a motor-driven or driveshaft driven supercharger compressor. In the engine system 100, the compressor 14 is shown as a turbocharger compressor mechanically coupled to turbine 16 via a shaft 19, the turbine 16 driven by expanding engine exhaust. In one embodiment, the compressor 14 and turbine 16 may be coupled within a twin scroll turbocharger. In another embodiment, the turbocharger 13 may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the engine intake manifold 22. Ambient airflow 116 from outside the vehicle may enter engine 10 through a vehicle grille 112 at a vehicle front end and pass across the CAC 18, to aid in cooling the charge air. Condensate may form and accumulate in the CAC 18 when the ambient air temperature decreases, or during humid or rainy weather conditions, where the charge air is cooled below the water dew point. When the charge air includes recirculated exhaust gases, the condensate can become acidic and corrode the CAC housing. The corrosion can lead to leaks between the air charge, the atmosphere, and possibly the coolant in the case of water-to-air coolers. Additionally, condensate may collect at the bottom of the CAC 18, and then be drawn into the engine at once during acceleration (or tip-in) increasing the chance of engine misfire. In one example, cooling of ambient airflow traveling to the CAC 18 may be controlled by the AGS system 110 such that condensate formation and engine misfire events are reduced. Specifically, AGS system 110 may include one or more active grille shutters 114 (also known herein as shutters, grille shutters, or the AGS system) that may be selectively controlled responsive to operating conditions including, but not limited to, engine coolant temperature and vehicle speed. In some embodiments, the position of the active grille shutters may be monitored by one or more optional AGS position sensors 115.

In some non-limiting examples, the opening angle of the AGS may be adjusted in order to control condensate formation at the CAC 18, as well as engine cooling and/or vehicle drag. In one example, the opening angle of the AGS may be decreased in order to decrease the amount of cool, humid air entering the grille and passing over the CAC. As a result, the outlet temperature of the CAC 18 may increase, thereby reducing the likelihood of condensate formation. In another example, the opening angle of the grille shutters 114 may be increased in order to increase the amount of cool air allowed to enter through the vehicle grille 112 and pass over the radiator 80. As a result, increased engine cooling may be achieved.

In the embodiment shown in FIG. 1, the pressure of the air charge within the engine intake manifold 22 is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Engine intake manifold 22 is coupled to a series of combustion chambers (e.g., cylinders 31) through a series of intake valves (not shown). In addition, fuel flow to the cylinders 31 may delivered via one or more fuel injectors 66, in a configuration known as direct injection. In some examples, engine 10 may additionally or optionally include fuel injectors located in the intake manifold 22, in a configuration commonly referred to as port injection. The combustion chambers 31 are further coupled to exhaust manifold 36 via a series of exhaust valves (not shown). In the depicted embodiment, a single exhaust manifold 36 is shown. However, in other embodiments, the exhaust manifold 36 may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, the emission control device 70 may include a plurality of emission control devices such as one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve 52 may be opened to admit a controlled amount of cooled exhaust gas to the compressor inlet for desirable combustion and emissions-control performance. In this way, engine system 100 is adapted to provide external, low-pressure (LP) EGR. The rotation of the compressor 14, in addition to the relatively long LP EGR flow path in engine system 100, may provide excellent homogenization of the exhaust gas into the intake air charge. Further, the disposition of EGR take-off and mixing points may provide more effective cooling of the exhaust gas for increased available EGR mass and enhanced performance. In other embodiments, the EGR system may be a high-pressure (HP) EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via a belt, chain, or the like (not shown). Specifically, engine-driven water pump 86 circulates coolant through passages in the engine block, engine head, and the like, to absorb engine heat, which is then transferred via the radiator 80 to ambient air. In an example where engine-driven water pump 86 is a centrifugal pump, the pressure (and resulting flow) produced at the engine-driven water pump outlet may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the coolant line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine FEAD 88 and driven by the engine crankshaft 140. In other embodiments, electric fan 92 may act as a dedicated CAC fan. In this embodiment, the electric fan 92 may be coupled to the CAC 18 or placed in a location to direct airflow directly toward the CAC 18. In yet another embodiment, there may be two or more electric fans 92. For example, one may be coupled to the radiator (as shown) for engine cooling, while the other may be coupled elsewhere to direct cooling air directly toward the CAC 18. In this example, the two or more electric fans 92 may be controlled separately (e.g., at different rotation speeds) to provide cooling to their respective components.

Coolant may flow through coolant line 82, as described above, and/or through coolant line 84 to heater core 90 where the heat may be transferred via air ducts (not shown) to the passenger compartment, and the coolant flows back to engine 10. In some examples, engine-driven water pump 86 may operate to circulate the coolant through both coolant lines 82 and 84.

FIG. 1 further shows an engine control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory (RAM), keep alive memory (KAM), and a data bus. As depicted, controller 12 may receive input from a plurality of sensors 30, which may include user inputs and/or sensor input data (e.g., transmission gear position, accelerator pedal position input, brake pedal input, transmission selector position, vehicle speed, engine speed, mass airflow through the engine, boost pressure, ambient temperature, ambient humidity, intake air temperature, fan speed, ambient light), cooling system sensors (e.g., engine coolant temperature, fan speed, passenger compartment temperature, ambient humidity), CAC 18 sensors (e.g., CAC inlet air temperature and pressure, CAC outlet air temperature and pressure), one or more optional AGS position sensors 115, and other vehicle sensors. In addition, controller 12 may receive data from a GPS 34, an in-vehicle communications and entertainment system 26, and/or other control systems of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, cloud cover, precipitation (e.g., rain, snow, hail, etc.), and humidity, may be obtained through various wireless communication device applications and weather-forecasting websites. Data obtained from the in-vehicle communications and entertainment system 26 may include current and predicted weather conditions for the current location, as well as future locations along a planned travel route. In one embodiment, where the in-vehicle communications and entertainment system 26 includes a GPS 34, current and future weather data may be correlated with current and future travel routes displayed on the GPS 34. In an alternate embodiment, wherein the vehicle system includes a dedicated GPS 34, each of the GPS 34 and the in-vehicle communications and entertainment system 26 may communicate with the wireless communication device 40, as well as with each other, to communicate current and future weather data with current and future travel routes. In one example, the in-vehicle and communications entertainment system 26 may access various weather maps stored on the internet or other cloud computing systems. The stored weather maps may include rain, humidity, precipitation, ambient light information, and/or temperature information provided as contour maps, for example. In one example, the wireless communication device 40 may relay real-time weather data to the in-vehicle communications and entertainment system 26, and/or GPS 34, which is then relayed to the controller 12. The controller 12 may compare the received weather data (which may include humidity data) to threshold values and determine the appropriate engine operating parameter adjustments. In one example, these adjustments may include adjusting the AGS system 110. For example, if humidity is greater than a defined threshold, one or more vanes of the AGS may be closed.

Furthermore, controller 12 may communicate with various actuators 32, which may include engine actuators (e.g., fuel injectors, an electronically controlled intake air throttle plate, spark plugs), cooling system actuators (e.g., air handling vents and/or diverter valves in the passenger compartment climate control system), AGS system actuators (e.g., AGS vanes, an AGS motor), and others. In some examples, the storage medium of controller 12 may be programmed with computer readable data representing instructions executable by the processor for performing the methods described below as well as other variants that are anticipated but not specifically listed.

As noted herein, the amount of waste heat transferred to the coolant from the engine 10 may vary with vehicle operating conditions, thereby affecting the amount of heat transferred to the air flowing through the engine system 100. For example, as engine output torque, or fuel flow, is reduced, the amount of waste heat generated may be proportionally reduced.

Motor vehicle 102 further includes a vehicle grille 112 providing an opening (e.g., a grille opening, a bumper opening, and the like) for receiving ambient airflow 116 (from outside the vehicle) through or near the front end of the vehicle and into the engine compartment. Entry of ambient airflow 116 into the engine compartment may be controlled by the AGS system 110 as previously described. Heat may be transferred to ambient airflow 116 via radiator 80, electric fan 92, and other components to keep the engine 10 and/or transmission cool. Further, the ambient airflow 116 may reject heat from the vehicle air conditioning system and can increase performance of turbo-charged/super-charged engines that are equipped with a CAC 18 that reduces the temperature of the air that goes into the intake manifold/engine. In one example, the electric fan 92 may be adjusted to further increase or decrease the airflow to the engine components. In another example, a dedicated CAC fan may be included in the engine system 100 for increasing or decreasing airflow to the CAC 18.

Figure 2:
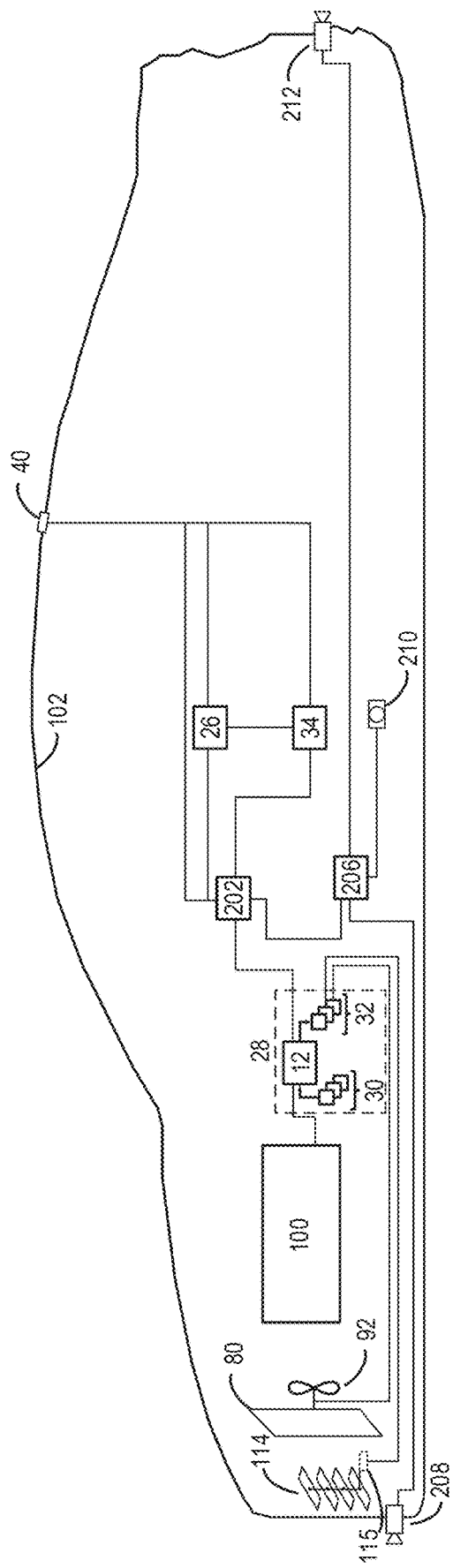
Figure 3A:
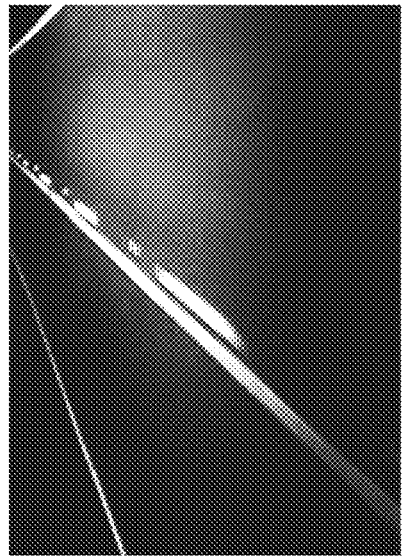
FIGS. 3A-3C show example images that may be obtained by a camera of the vehicle of FIGS. 1-2.
Figure 3B:
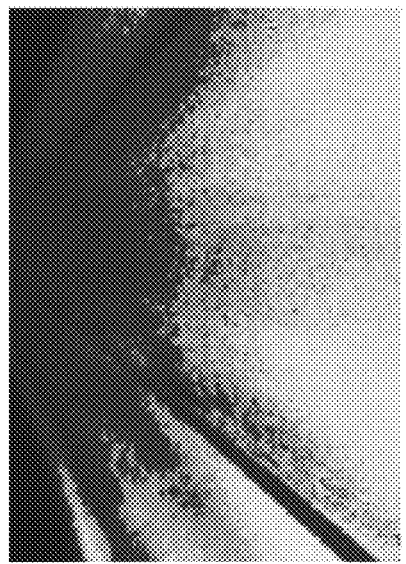
Figure 3C:

Referring to FIG. 2, a larger schematic of a vehicle 102 is shown. In addition to engine system 100, the engine control system 28 (with electronic digital controller 12, sensors 30, and actuators 32), the AGS system 114, the AGS position sensors 115, the radiator 80, and the engine fan 92 previously described, vehicle 102 includes a navigation system 34, an in-vehicle communications and entertainment system 26, a camera control system 206, and a central supervisor control system 202. As with the engine control system 28, these individual systems may include an electronic microcomputer controller with a microprocessor unit, input/output ports, an electronic storage medium for executable programs and calibration values, random access memory (RAM), keep alive memory (KAM), and a data bus. These five control systems may also include functionally appropriate sensors and actuators. The five control systems all communicate and work together simultaneously during vehicle operation. It will be appreciated that other embodiments may only have a single computer control system that performs all or some of the duties of the other control systems in FIG. 2. Other embodiments may have control systems that perform two or more of the functions of these individual systems.

The in-vehicle communications and entertainment system 26 interacts with the users directly. In one embodiment, the in-vehicle communications and entertainment system 26 is a console integrated into the dashboard or steering wheel displaying key vehicle data from the other system controllers, such as speed, engine RPM, GPS position, and side-facing blind spot camera view, among other things. The in-vehicle communications and entertainment system 26 may also be controlled via touch or voice commands. Additionally, the in-vehicle communications and entertainment system 26 may have one or more audio and video displays for vehicle passengers that can also be controlled via touch and voice commands. The in-vehicle communications and entertainment system 26 can also transmit and receive data with the wireless communication device 40.

The camera control system 206 may use one or several visible light cameras situated on or in the vehicle. In the illustrated embodiment, the vehicle includes exterior front-facing visible light cameras 208, side-facing visible light cameras 210, and rear-facing visible light cameras 212 which image the surroundings of the vehicle. These cameras may have sensitivity in the near infrared (IR) light range as well, or may be coupled with one or more far IR light range sensors for camera functionality in low light conditions. The camera control system 206 obtains data from these cameras and feeds it to both the in-vehicle communications and entertainment system 26 for user review and the central supervisor system 202 for integration with information from other systems. These images are also stored and processed by the camera control system 206 to determine useful parameters, such as, but not limited to: object/location recognition, obstacle detection and distance, ambient light levels, and relative vehicle speed, which are then fed to the in-vehicle communications and entertainment system 26 as well as the central supervisor system 202. The distance determined by camera control system 206 to be between front-facing camera 208 and a detected object/obstacle will be referred to as the front camera distance, which is also a measure of clearance in front of the vehicle that allows for uninhibited vehicle movement.

The navigation control system 34 receives GPS data from the wireless communication device 40. The navigation control system 34 may use this information simultaneously with saved map data to determine vehicle location and calculate trip routes, which are shared with the user via the in-vehicle communications and entertainment system 26. The navigation control system 34 may also share this information with the central supervisor system 202 as well.

The supervisor control system 202 sends and receives information from all of the other vehicle control systems. The supervisor control system 202 may monitor, record, and send data to and from the other control systems. In addition, the supervisor control system 202 may also send and receive data from the wireless communication device 40 and feed it to the other control systems. It will be appreciated that in some embodiments the supervisor control system 202 may direct the autonomous operation of the vehicle as well.

Referring now to FIGS. 3A-3C, front-facing camera 208 is configured to acquire images of the immediate surroundings in front of the vehicle. These images are then used by the camera control system 206, which may send the images to the driver for display via the in-vehicle communication and entertainment system 26. The camera control system 206 may also analyze images from front-facing camera 208 to extract useful information, such as detected objects, obstacle distance, vehicle speed, and ambient light levels. FIG. 3A shows an example of what front-facing camera 208 images on a clear open road in the visible light spectrum with no detected obstacles.

Front-facing camera 208 may also image in the near infrared (IR) light spectrum or be coupled with one or more far IR light spectrum sensors, which may provide temperature information in the form of a heat map. In a heat map, the brightness of each monochromatic pixel corresponds to the relative temperature of the object in the image. In both FIGS. 3B and 3C, two illustrative IR heat maps are shown of the same clear open road visualized in FIG. 3A. In FIG. 3B, at the bottom of the heat map, which corresponds to space closer to the front of vehicle 102, a large bright region is observed, which is correlated to warmer air in front of the vehicle. In FIG. 3C, on the other hand, the same region of the heat map is much less bright, which correlates much cooler air in front of the vehicle than observed in FIG. 3B.

Camera control system 206 may analyze the heat maps obtained from front-facing camera 208 to determine the presence of heat signatures, or regions of higher relative temperature compared to the surrounding environment. These heat signatures can be found by camera control system 206 using one or several computer vision algorithms, such as pixel counting/averaging, edge detection, or blob detection. Additionally, image comparisons between saved heat maps in camera control system 206 and heat maps obtained by front-facing camera 208 may be used as well. In one implementation of heat signature detection, camera control system 206 may search for heat signatures obtained from front-facing camera 208 using an average pixel value of a rectangular selection of pixels comprised of several bottom rows of the heat map. If the average pixel value is higher than a predetermined value, such as would be the case in FIG. 3B, a heat signature would be determined to be present. If the average pixel value in this rectangle is less than a predetermined value, such as would be the case in FIG. 3C, then a heat signature would not be detected. In the example presented above, the pixel values of FIGS. 3A-3C may be standard grayscale values where a pixel value of zero corresponds to a black pixel and a pixel value of 255 corresponds to a while pixel, but other pixel values are possible without departing from the scope of this disclosure.

FIGS. 4A and 4B show partial schematic views of vehicle 102 including engine cooling fan 92 operating in a forward or reverse direction and illustrating how the engine is cooled down when the AGS shutters are open. During normal operation, the vehicle engine (e.g., engine 10 of engine system 100) generates heat 402 which is rejected to atmosphere by the engine radiator 80. The cooling fan 92 rotates (e.g. in a forward direction 410 as shown in FIG. 4A) to draw in ambient air over the radiator 80 and engine, further moving heat 404 away from the engine. When the engine underhood temperature as measured by the thermometer 116 (or when engine coolant temperature as measured by an engine coolant temperature sensor) is determined to be above a threshold temperature, the engine control system commands the AGS system 110 to open the active grille shutters 114 via the actuators to allow outside air to flow to the engine radiator 80 and the rest of the engine underhood to assist in cooling. As shown in FIG. 4B, the AGS may diagnosed by running the engine cooling fan 92 in the reverse direction 412 pushing warm air out the front of the vehicle 414. Depending on the position and condition of the AGS, the warm air exiting the front of the vehicle 414 may be imaged by the front-facing camera 208 in IR mode.

Referring now to FIG. 5, a method 500 for operating an active grille shutter (AGS) system, such as AGS system 110, is shown. Instructions for carrying out method 500 and the rest of the methods included herein may be executed by a controller (e.g., control system 28 of FIG. 1) based on instructions stored on a memory of the controller and in conjunction with signals received from sensors of the engine system, such as the temperature sensors and forward-facing camera described above with reference to FIG. 1. The controller may employ engine actuators (e.g., actuators of the AGS system) of the engine system to adjust engine operation, according to the methods described below.

At 502, method 500 determines operating parameters. The determined operating parameters may include but are not limited to time since engine start, engine speed, engine load, engine underhood and/or engine coolant temperature, and AGS open/close status. At 504, method 500 determines if the vehicle engine is off. The vehicle engine may be determined to be off based on an ignition signal (e.g., ignition key in an off position, termination of an ignition signal from a push-button) and/or based on a command from the controller indicating to propel the vehicle with energy from an electric motor rather than the engine. If the engine is off, method 500 proceeds to 512 to check conditions for executing a diagnostic routine of the AGS system, which will be explained in more detail below with respect to FIG. 8A.

If the vehicle engine is not off, method 500 proceeds to 506 and does not perform the AGS system diagnostic routine. At 508, method 500 includes adjusting the AGS system based on engine temperature. Additional details about the adjustment of the AGS system based on engine temperature will be provided below with respect to FIG. 6. At 510, method 500 includes obtaining image data from the front-facing camera (e.g., camera 208) during select conditions. Additional details about the image data from the front-facing camera will be provided below with respect to FIG. 7. Method 500 then returns.

FIG. 6 illustrates a method 600 for adjusting an AGS system, such as AGS system 110. At 602, method 600 includes determining operating parameters. The determined operating parameters may include engine temperature (e.g., from an underhood temperature sensor and/or an engine coolant temperature sensor), vehicle speed, accelerator pedal position, CAC conditions (e.g., temperature, condensation accumulation), and other parameters. At 604, method 600 includes determining a target AGS position. The target AGS position may be based on one or more operating parameters in order to provide sufficient engine cooling while reducing drag. The target AGS position may be based on one or more of vehicle speed, as indicated at 606, engine temperature (such as engine coolant temperature), as indicated at 608, pedal position (as indicated at 610), and charge air cooler conditions, as indicated at 612. The target AGS position may include fully open (where the shutters of the AGS system provide minimal blockage of the openings of the grille), fully closed (where the shutters of the AGS system provide maximal blockage of the openings of the grille), or a position between fully open and fully closed. In some examples, the target AGS position may be determined from a look-up table that maps operating parameters (e.g., engine temperature) to target AGS position (e.g., a degree of opening of the AGS shutters).

At 614, method 600 includes determining if the AGS system is in the target position. The current position of the AGS shutters may be determined from a previous command sent to the AGS system, a position of a stepper motor or other actuator controlling the AGS shutter position, a motor current of the actuator controlling the AGS shutter position, one or more AGS position sensors, and/or other parameter. If the AGS system is currently in the target position, method 600 proceeds to 616 to maintain the current shutter position, and then method 600 returns. If the AGS system is not currently in the target position, method 600 proceeds to 618 to adjust the shutter position of the AGS system to the target position. Adjusting the AGS position may include adjusting a signal sent to an actuator of the AGS system, e.g., a motor current of the actuator controlling the AGS shutter position. Method 600 then returns.

FIG. 7 illustrates a method 700 for operating a forward-facing camera, such as camera 208. At 702, method 700 includes activating the camera when indicated. The forward-facing camera may be activated during certain vehicle operating conditions. For example, the forward-facing camera may be activated during adaptive cruise control mode, where vehicle speed is controlled automatically by the cruise control system based on a user-requested target speed and a predefined minimum distance between the vehicle and a preceding vehicle, which may be determined by the forward-facing camera. In another example, the forward-facing camera may be activated when vehicle speed is above a threshold speed and/or in response to a user request to operate in autobrake mode, where the vehicle brakes may be activated (or the vehicle is otherwise rapidly slowed, such as via modulation of engine or motor torque) based on detection of an obstacle in front of the vehicle, as determined by the forward-facing camera. In a further example, the forward-facing camera may be activated during a vehicle parking event (which may be detected based on vehicle gear, turn signal activation, and/or other parameters) to assist the driver in visualizing nearby objects during parking.

The forward-facing camera 208 may be activated to obtain data usable to generate one or more images. Data from forward-facing camera 208 may additionally or alternatively be processed to determine a distance, size, shape, and/or speed of any obstacles in front of the vehicle. Forward-facing camera 208 may acquire visible light image information, near and/or far infrared image information, depth image information, or other suitable image information depending on the configuration of the forward-facing camera and the operating mode of the vehicle.

Upon activation of the forward-facing camera, one or more images obtained by the forward-facing camera may be displayed on an in-vehicle display device, as indicated at 704. However, display of an image obtained by the camera is optional, and in other examples the obstacle detection and/or other actions taken based on the output from the forward-facing camera may be performed using imaging data collected by the camera without generating and/or displaying an image.

At 706, method 700 includes determining if an obstacle is detected based on output from the forward-facing camera. For example, one or more images obtained from the forward-facing camera may be analyzed to determine if an obstacle is present in the field of view of the camera. The obstacle may be detected using an image recognition algorithm, edge detection, blob tracking, or other suitable image analysis. Further, multiple images obtained over time may be analyzed to determine if the obstacle is moving, and if so, how fast the obstacle is moving and in which direction.

If an obstacle is not detected, method 700 proceeds to 708, where no further action is taken. In this way, the vehicle may continue current operation and may not make any operating adjustments based on output from the camera. Method 700 then returns. If an obstacle is detected, method 700 proceeds to 710 to take an action, where the action taken may depend on the current mode of vehicle operation and nature of the object. In one example, taking an action may include notifying the driver of the obstacle, as indicated at 712. The notification may include an audio alert, a haptic alert, and/or a visual alert. As another example, taking an action may include activating an autobrake, as indicated at 714. For example, if an obstacle is detected that is within a threshold distance of the vehicle, and the vehicle is moving at a threshold speed or greater (e.g., indicating the vehicle is not executing a parking maneuver or in heavy traffic), the vehicle brakes may be actuated automatically. In a further example, as indicated at 716, taking an action may include adjusting vehicle speed. For example, the vehicle may be slowed if adaptive cruise control is active and a distance to a preceding vehicle drops to a minimum distance. Other actions based on obstacle detection are possible, such as turning the steering wheel (e.g., when an autoparking mode is selected). Additionally, if the vehicle is operating an automated mode, nearly all vehicle operations (e.g., speed, steering wheel position and/or electronic steering position) may be based on information from the forward-facing camera. Method 700 then returns.

Referring now to FIG. 8A, a method for determining if an AGS diagnostic test should be performed after key-off is shown. The method of FIG. 8A is incorporated into the supervisor system 202 in FIG. 1A as executable instructions stored in non-transitory memory. The method of FIG. 8A may communicate with the navigation control system 34, the camera control system 206, and the engine control system 28.

At 801, method 800 determines operating parameters. Theses parameters may include, but are not limited to time since engine start, current live GPS location, vehicle speed, current mileage on vehicle, and engine coolant temperature. The operating parameters may be determined via data from engine sensors described in FIG. 1, control systems described in FIG. 2, and from transfer functions for converting sensor output to variable values. Method 800 proceeds to 802 after operating parameters are determined.

At 802, method 800 judges if the vehicle is not moving. In order to perform the AGS diagnostic test, the vehicle may be parked and/or not moving (e.g., not in a situation where engine is off, but the vehicle is still in motion, such as if the vehicle is a hybrid being propelled by an electric motor). The vehicle moving status may be determined from the operating parameters found in 801, including the current live GPS location and vehicle speed. If method 802 judges that the vehicle is not moving, the answer is yes and method 800 proceeds to 804. Otherwise, the answer is no and method 800 proceeds to 818.

At 804, method 800 judges if a predetermined number of miles has been met by the vehicle. In this example, execution of the AGS diagnostic test is determined by the current mileage of vehicle 102, in that after a certain mileage the vehicle may be old enough to justify an AGS diagnostic test. In other examples, execution of an AGS diagnostic test may be determined by a set calendar time on a time interval after vehicle manufacture, based on a number of miles driven since a previous AGS diagnostic test was carried out, and/or other parameter irrespective of the vehicle age. If method 800 judges that a predetermined number of miles has been met by the vehicle, the answer is yes and method 800 proceeds to 806. Otherwise, the answer is no and method 800 proceeds to 818.

At 806, method 800 measures the engine coolant temperature. Method 800 determines the engine coolant temperature from sensors described in FIG. 1.

At 808, method 800 judges if the engine coolant temperature is within a predetermined temperature range. This predetermined temperature range may be set by the vehicle manufacturer and may be a temperature range in which the AGS diagnostic test was found to work reliably. If the temperature is too high, too much heat emanates from the front of the vehicle, which may cause a false-positive heat signature detection using the methods described above with respect to FIGS. 3B and 3C. Additionally, if the temperature is too low, not enough heat emanates from the front of the vehicle, which may cause a false-negative heat signature detection using the methods described above with respect to FIGS. 3B and 3C. By choosing an engine coolant temperature range, the reliability of the AGS diagnostic test can be standardized and more robust under different conditions. In one example, the temperature range may be 220-250° F. In another example, the AGS diagnostic routine may only be carried out when engine coolant temperature is greater than 220° F. If method 800 judges that the engine coolant temperature is inside the predetermined range, the answer is yes and method 800 proceeds to 810. Otherwise, the answer is no and method 800 proceeds to 818.

At 810, method 800 activates the front-facing camera, such as camera 208. Method 800 may activate the front-facing camera via the camera control system 206 described in FIG. 2. Method 800 proceeds to 812 after the front-facing camera is activated.

At 812, method 800 judges if there is enough clearance in front of the vehicle for the AGS diagnostic test. This predetermined clearance can be set by the vehicle manufacturer and may be a clearance in which the AGS diagnostic test was found to work reliably. To detect engine heat reliably during the AGS diagnostic test, it may be desirable if there is a large amount of open space in front of the vehicle, or a far front camera distance, as shown in FIG. 3A. This allows front-facing camera 208 to detect regions of warm air, which would be close to the front of the vehicle, and cooler air, which would be farther away in front of the vehicle, with highest possible signal-to-noise ratio. If there is not enough clearance in front of the vehicle, the entire view of the front-facing camera may be obscured by warm air, creating a false-negative heat signature detection. In an example, the predetermined clearance in front of the vehicle may be a fixed clearance, such as ten or twenty feet. In other examples, the predetermined clearance may be based on the identity of any detected obstacles in front of the vehicle. For example, if another vehicle is detected in front of the vehicle, the predetermined clearance may be further (e.g., 30-50 feet) than if a shrubbery is detected in front of the vehicle (e.g., where the predetermined clearance may be 20 feet), as the other vehicle may be predicted to generate heat that could confound the results of the diagnostic test. In still further examples, the predetermined clearance may be determined to be met only if no obstacles of any form are detected within the predetermined clearance, while in other examples, small obstacles may be tolerated. If method 800 judges that there is enough clearance in front of the vehicle, the answer is yes and method 800 proceeds to 814. Otherwise, the answer is no and method 800 proceeds to 818.

At 814, method 800 determines the geographical location of the vehicle. Method 800 may determine the geographic location of the vehicle via the wireless communication device 40 and the navigation control system 34 described in FIG. 2, for example. Method 800 proceeds to 816 after the geographical location of the vehicle is obtained.

At 816, method 800 optionally judges if the vehicle is in an appropriate predetermined location for the AGS diagnostic test. This predetermined appropriate location may be set by the user of the vehicle so that the vehicle will remain parked for a sufficiently long enough time for the AGS diagnostic test to be finished. In one example, the user may have the option to program several geographic locations, such as the location of his or her driveways, where the vehicle will be parked for an extended period of time. The vehicle will only perform diagnostic tests at these locations. If method 800 optionally judges that the vehicle is in an appropriate predetermined location, the answer is yes and method 800 proceeds to method 850 shown in FIG. 8B. Otherwise, the answer is no and method 800 proceeds to 818.

At 818, method 800 takes no action. After 802, since the vehicle is still moving, the AGS diagnostic will not be performed. After 804, since the current number of miles incurred by the vehicle 802 did not meet the predetermined number set in 804, the diagnostic is not performed. After 808, since the engine coolant temperature 806 was not within the predetermined range set in 808, the diagnostic is not performed. After 812, since there is not a predetermined minimum distance in front of the vehicle for the AGS diagnostic test set in 812, the diagnostic is not performed. After 816, since the vehicle is not in an optional appropriate predetermined location for the AGS diagnostic test set in 816, the diagnostic is not performed. Method 800 returns after no action is taken. In some examples, taking no action may include maintaining current operating parameters (e.g., maintaining current vehicle speed if the vehicle is in motion).

Referring now to FIG. 8B, at 852, method 850 (which is a continuation of method 800) includes closing the AGS system 110 (e.g., commanding the shutters of the AGS system to move to the fully closed position). If the AGS is functioning properly, the fully closed shutters prevents air from passing between the underhood and the outside of the vehicle. Method 850 proceeds to 854 after the AGS system 110 is commanded to close.

At 854, method 850 turns on the engine cooling fan 92 in the reverse direction 310. The reverse-rotation of the cooling fan drives warm air from inside the engine underhood towards the closed AGS system. Method 850 proceeds to 856 after turning on the engine cooling fan 92 in reverse 412.

At 856, method 850 waits a predetermined amount of time. The predetermined amount of time may be determined by the vehicle manufacturer based on the time required to observe heat signatures, such as the heat signatures described with respect to FIGS. 3B and 3C, when the active grille shutters are not closed properly, such as 1-3 seconds. Method 850 proceeds to 858 after waiting the predetermined amount of time.

At 858, the front-facing camera is activated in the IR mode to image the space in front of the vehicle to obtain a heat map. If the AGS system is functioning properly, no heat signatures should be observed as described with respect to FIG. 3C. If the active grille shutters are degrading or stuck open, then heat signatures will be observed in front of the vehicle. Method 850 proceeds to 862 after imaging the front of the vehicle with the front-facing camera in IR mode.

At 862, method 850 opens the AGS system 110 (e.g., sends a command to the AGS system to fully open the shutters of the AGS system). If the AGS system is functioning properly, heat signatures are predicted to be observed in front of the vehicle as described with respect to FIGS. 3B and 3C. Method 850 proceeds to 864 after opening the AGS system.

At 864, method 850 waits a predetermined amount of time. The predetermined amount of time may be based on the time required to observe heat signatures (such as the heat signatures described above with respect to FIGS. 3B and 3C) when the active grille shutters are not opened properly. Method 850 proceeds to 865 after waiting the predetermined amount of time.

At 865, the front-facing camera is activated in the IR mode to image the space in front of the vehicle to obtain a heat map. If the AGS system is functioning properly, heat signatures are predicted to be observed as described with respect to FIG. 3B. If the active grille shutters are degraded in a stuck open position, then heat signatures will be observed in front of the vehicle. Method 850 proceeds to 860 after imaging the front of the vehicle with the front-facing camera in IR mode.

At 860, method 850 judges if heat signatures are present in front of the vehicle when the shutters are commanded fully closed, based on the first image obtained at 858, which was the first IR image obtained in method 850. If method 850 judges that heat signatures are present in front of the vehicle when the shutters are commanded to be fully closed, the answer is yes and method 850 proceeds to method 870. Otherwise, the answer is no and method 850 proceeds to 866.

At 866, method 850 judges if heat signatures were present in front of the vehicle when the shutters are commanded fully open, based on the second image obtained at 865. If method 850 judges that heat images were present in front of the vehicle when the shutters are commanded to be fully open, the answer is yes and method 850 proceeds to method 868. Otherwise, the answer is no and method 850 proceeds to 876.

At 868, method 850 concludes that the AGS system is functioning properly, as heat signatures in front of the vehicle were not observed when the AGS system was closed and heat signatures were observed when the AGS system was opened. Method 850 proceeds to 882 after concluding the AGS system is functioning properly.

At 882, method 850 turns off the engine cooling fan 92. The AGS diagnostic is finished and the vehicle can power down. Method 850 returns after turning off the engine cooling fan 92.

At 870, method 850 determines the AGS system is not closing properly due to heat signatures being observed in front of the vehicle when the AGS system was closed. Method 850 proceeds to 872 after determining the AGS was not closing properly.

At 872, method 850 notifies the operator and records the non-closing AGS system issue. The notification and/or recording of the degraded AGS system may include activating a check engine light while logging the issue (e.g., setting a diagnostic code) in the engine control system 28 or the supervisor system 202. Method 850 proceeds to 874 after notifying and recording the non-closing AGS issue.

At 874, method 850 adjusts operating parameters. Since degradation of the AGS system has been determined to exist, the engine control system 28 may command the vehicle to operate in an alternate cooling mode. In an example, engine control system 28 may prevent the engine cooling fan 92 or reduce the circulation of coolant from the radiator to the engine. Method 850 returns after adjusting the operating parameters.

At 876, method 850 determines the AGS system is not opening properly due to heat signatures not being observed in front of the vehicle when the AGS system was opened. Method 850 proceeds to 878 after determining the AGS was not opening properly.

At 878, method 850 notifies the operator and records the non-opening AGS system issue. This may be done by activating a check engine light while logging the issue in the engine control system 28 or the supervisor system 202. Method 850 proceeds to 880 after notifying and recording the non-opening AGS issue.

At 880, method 850 adjusts operating parameters. Since degradation of the AGS system has been determined to exist, the engine control system commands the vehicle to operate in a safe mode to preserve the engine. In an example, engine control system 28 may reduce the torque the engine can deliver to the wheels as well as the total horsepower of engine system 100 to prevent engine overheating due to the shutters being unable to fully open. Method 850 returns after adjusting the operating parameters.

Thus, method 800 described above provides for a diagnostic routine for detecting degradation of an AGS system based on IR image data output from an infrared camera. The diagnostic routine may be carried out responsive to a non-moving vehicle condition where an engine of the vehicle is off, such as when the vehicle is parked or when an automatic stop is performed while the vehicle is waiting at a stop light. The diagnostic routine may further be performed responsive to a determination that the engine temperature is greater than a threshold temperature, such as greater than 220° F. In some examples, the diagnostic routine may only be executed if a predetermined clearance in front of the vehicle is met. For example, prior to executing the diagnostic routine, a front-facing camera (which may the same camera used to obtain the IR image data used during the diagnostic routine, or may be a different camera) may obtain image data (e.g., visible light or IR image data) and the system may determine if any objects are present in the field of view of the camera. If any objects are detected, the image data may be analyzed to determine the distance between the vehicle and the detected object(s). If the object(s) is at least a threshold distance from the vehicle (such as 5 or 10 meters), the diagnostic routine may be performed. Further, in some examples, the diagnostic routine may be executed responsive to loss of AGS system position sensor data. The AGS system may include position sensors which output information usable to determine the position of the AGS system shutters. If the AGS system is commanded to change position, but the position sensors are not outputting position data, or the position sensors are outputting non-changing position data, the system may command the diagnostic routine be executed at the next vehicle shutdown, for example.

The diagnostic routine includes the acquisition of heat maps (also referred to as heat images or IR images) from a front-facing IR camera while the AGS system is two or more positions. For example, a first IR image may be acquired while the AGS system is in a fully closed position (where the shutters are at a maximum closed position, such as a position where the shutters fully block the grille openings) and a second IR image may be acquired while the AGS system is in a fully open position (where the shutters are at a maximum open position, such as a position where the shutters minimally block the grille openings). The IR images may be analyzed to determine if engine heat is being retained in the underhood space of the vehicle (indicating the shutters are closed) or if engine heat is being rejected to ambient (indicating the shutters are open). To facilitate the rejection of engine heat to the front of the vehicle, an engine cooling fan may be run in a reverse direction during the diagnostic routine to draw air over the engine and out of the front of vehicle (in contrast to normal vehicle operation, where the cooling fan may be run in a forward direction to draw air over the engine and away from the front of the vehicle.

The AGS system may be diagnosed based on the IR image data. In one example, the AGS system may be determined to be degraded if the IR image data indicates the same heat signature was observed when the AGS system shutters were fully closed and when the AGS system shutters were fully open. For example, if the first IR image is substantially similar to the second IR image, the AGS system may be determined to be degraded, as the temperature in front of the vehicle did not change upon changing the position of the AGS system. In another example, the first IR image and the second IR image may be compared to respective baseline IR images to determine if an expected heat signature is observed. For example, the first IR image may be compared to a baseline fully closed IR image obtained at the time of vehicle manufacture or other period where the AGS system is determined to be functional and when the shutters are fully closed. The second IR image may be compared to a baseline fully open IR image obtained at the time of vehicle manufacture or other period where the AGS system is determined to be functional and when the shutters are fully open. If each IR images matches the respective baseline image, the AGS system may be determined to be functional.

While the diagnostic routine described above included acquisition of only two IR images (one when the shutters are fully closed and one when the shutters are fully open), other configurations are possible without departing from the scope of this disclosure. For example, more than one IR image at a given shutter position may be acquired. Each IR image acquired at a given shutter position may be averaged to obtain an average IR image for that shutter position. Additionally or alternatively, additional IR images at additional shutter positions may be acquired. For example, in addition to fully open and fully closed, the AGS system may be commanded to one or more partially open positions, such as 25%, 50%, and 75% open, and a respective IR image may be acquired at each position. In still further examples, a series of IR images may be obtained over time at each shutter position and the dissipation of the engine heat may be tracked. The rate of movement/dissipation of the engine heat may be determined and compared to a threshold to determine if the AGS system is functional.

The analysis of the obtained IR image data may be performed to determine if the shutters of the AGS system are stuck in a given position. For example, rocks, leaves, ice, or other debris may become lodged in the grille, preventing the shutters from fully closing. If the first IR image (obtained when the shutters are commanded to be fully closed) has a heat signature indicative of at least some engine heat being rejected to the ambient, the AGS system may be determined to be stuck in an at least partially open position.

The IR images may be analyzed in a suitable manner to determine the heat signature of each image. As explained previously, an average temperature may be determined for each IR image. The average temperature may be determined for the entire image, or for only a subset of the image (e.g., in a region at the front of the vehicle). In other examples, a peak temperature may be determined and/or a location of the peak temperature relative to the vehicle may be determined. In another example, a thresholding function may be performed on each IR image. The thresholding function may include determining the ambient temperature (based on output from an ambient temperature sensor and/or based on pixel values of regions spaced away from the vehicle) and then thresholding each IR image using the ambient temperature, such that each pixel that is greater than the ambient temperature is given a certain value (e.g., 1) while each pixel at or below the ambient temperature is given a different value (e.g., 0). The area of each image having a pixel value of 1 may be determined and compared to each other or to an expected area to determine if heat is being rejected to ambient or maintained in the vehicle. In still further examples, an image subtraction may be performed, where the first IR image pixel values may be subtracted from the second IR image pixel values. If a threshold number of pixels (after the subtraction) have a value greater than a threshold value (such as greater than 1, or greater than 10), it may be determined that the second IR image represents a higher temperature/more heat rejection than the first IR image. In any or all of the above presented examples, the IR images may be normalized to ambient temperature before being analyzed to determine the heat signatures.

If the AGS system is determined to be degraded, an operator may be notified and/or a diagnostic code may be set. Further, depending on the type or extent of degradation, engine and/or vehicle operating parameters may be adjusted. For example, if the diagnostic routine indicates that the shutters are unable to fully close, the AGS system may be commanded to cycle between fully closed and fully open a predetermined amount of times and/or at a predetermined rate in an attempt to dislodge any debris. If the shutters are still unable to fully close, engine cooling strategies may be adjusted to account for the overcooling that may occur due to the shutters being unable to fully close. If the diagnostic routine indicates the shutters are unable to fully open, engine operations may be adjusted to prevent engine overheating, such as reducing torque, disabling or reducing AC compressor operation, or other operational adjustments. In still further examples, if the diagnostic routine is performed responsive to a loss of position sensor data, or if the position sensor data does not change even as AGS system position is commanded to change, the AGS system may be vindicated as the source of degradation (and the position sensors may be implicated as the source of degradation) if the diagnostic routine indicates the AGS system is changing position as commanded.

Turning now to FIG. 9, an example timeline operation map 900 of vehicle 102 with engine system 100 and the control systems depicted in FIG. 2 is shown. The map 900 of FIG. 9 shows a vehicle engine status plot at 902, a vehicle speed plot at 904, an engine coolant temperature plot at 910, a front camera distance plot at 912, an autobrake plot at 918, a cooling fan status plot at 920, a predetermined GPS test location plot at 922, a run diagnostic entry condition check plot at 924, and an AGS position plot at 932. Map 900 also includes detected heat signature plots for the cases when the AGS diagnostic determines the active grille shutters function properly 926, are not sufficiently closing 928, or are not sufficiently opening 930. All plots are depicted over time along the x-axis. In addition, the magnitude of a parameter represented in any given plot increases along the y-axis going from bottom to top, as shown. Time markers t1-t8 depict times where significant events occur.

Prior to time t1, the vehicle engine is on (plot 902) while the vehicle speed (plot 904) and the front camera distance (plot 912) are constant. This may occur when driving on a highway with adaptive cruise control. During this time period, the engine coolant temperature (plot 910) is within a predetermined temperature range: above lower temperature threshold 908 and below upper temperature threshold 906. Since the engine coolant temperature is between lower threshold temperature 908 and upper temperature threshold 906, the AGS system is commanded to remain closed (plot 932) in order in increase vehicle aerodynamics. In this example, the temperature range defined by 908 and 906 is both the ideal operating temperature for engine system 100 and the required temperature range to perform the AGS diagnostic test. The cooling fan is running in forward mode, assisting the radiator in cooling engine system 100. It should be noted that the autobrake is off (plot 918) and remains off prior to time t4. In addition, vehicle 102 is not in an optional predetermined GPS test location (plot 922) and remains so until after time t5. Because of these conditions, the AGS diagnostic is not performed, so the run diagnostic entry condition check (plot 924) is at the "No" position until time t6. This also is the case for the possible detected heat signatures (plots 926, 928, and 930), which are only being measured during the AGS diagnostic test after time t6. Therefore, the run diagnostic check is at "No" and the detected heat signatures is at "N/A" before time t6.

At time t1, responsive to the engine coolant temperature reaching upper threshold 906, engine control system 28 may send a signal to the actuator of the AGS in order to power on the AGS motor and actuate a mechanical linkage to open the active grille shutters (plot 932). Between times t1 and t2, responsive to the opening of the AGS, the engine coolant temperature begins to decrease (plot 910) due to increased airflow. The cooling fan remains on to further assist bringing the engine coolant temperature (plot 910) beneath upper threshold temperature 906.

In addition, as shown by the decreasing front camera distance (plot 912), vehicle 102 is closing in on an obstacle, which may be another vehicle ahead of vehicle 102 slowing down. In response to this, either the driver or the adaptive cruise control system reduces the vehicle speed between times t1 and t2. The front camera distance is above threshold distance 916, so the autobrake is not activated (plot 918).

At time t2, the vehicle comes to a complete stop and is shut off (plot 902), which may happen upon reaching a parking location or stopping for a prolonged period of time in a traffic jam. At time t2, the active grille shutters are closed (plot 932) and the cooling fan is off (plot 920). Between times t2 and t3, the engine coolant temperature (plot 910) continues to decrease, since the engine is now off and not producing any excess heat, and is beneath upper threshold temperature 906. In addition, the front camera distance remains constant, which is to be expected in a parking situation, and is below threshold distance 914. Threshold distance 914 is the predetermined clearance in front of the vehicle, determined in 812 of FIG. 8A, needed in order to perform the AGS diagnostic test. Because the front camera distance is below threshold 914 and not in the optional predetermined GPS location, the AGS diagnostic test is not performed (plot 924).

At time t3, the vehicle engine is turned on (plot 902) along with the engine cooling fan (plot 920) and the vehicle begins to increase in speed (plot 904). This may be in response to the driver leaving a parking location or the traffic jam clearing, as suggested by the increasing front camera distance (plot 912). The engine coolant temperature is between upper threshold temperature 906 and lower threshold temperature 908, so the active grille shutters remain closed (plot 932).

Between times t3 and t4, the front camera distance (plot 912) begins to change rapidly. While it initially started to increase at time t3, it maxes out and begins to quickly decrease as time t4 is approached. This may occur when a vehicle in front of vehicle 102 rapidly increases in speed and, in response to an unforeseen obstacle, brakes suddenly to decrease in speed. In this time window, the front camera distance drops below both thresholds 914 and 916.

In this example, front camera distance thresholds 914 and 916 are shown to be two different values, with the autobrake threshold 916 below the AGS diagnostic threshold 914. In other examples, they could be the same threshold distance or the autobrake threshold may be greater than the AGS diagnostic threshold. In some examples, the autobrake threshold depends on the stopping distance of the vehicle and is thus depended on the current vehicle speed, so is the autobrake threshold may be variable.

At time t4, the autobrake is activated (plot 918) due to the front camera distance dropping below threshold 916. This causes the vehicle speed to drastically decrease (plot 904) to avoid a vehicle collision. As the vehicle decreases in speed, the front camera distances increases above threshold 916 and the autobrake deactivates at time t5.

At time t5, the vehicle begins to increase in speed (plot 904). Between times t5 and t6, the optional predetermined GPS test location (plot 922) switches to the "Yes" position. This may occur as the vehicle is approaching a location saved by the user that is appropriate for the AGS diagnostic test, such as a driveway or assigned parking space. In addition, the front camera distance (plot 912) is above both distance thresholds 914 and 916 and the engine coolant temperature is between both upper threshold temperature 906 and lower threshold temperature 908.

At time t6, the vehicle engine is switched off (plot 902). All the entry conditions for executing the AGS system diagnostic test have been met (e.g., the entry conditions described above with respect to FIG. 8A are met), the run diagnostic entry condition check switches to the "Yes" position (plot 924), and the AGS diagnostic test is performed. The engine cooling fan is switched to run in reverse (plot 920) while the AGS position is commanded to stay closed (plot 932). At this time, the front-facing camera switches to an IR imaging mode and sends data to the camera control system, which searches for heat signatures in the resulting images as previously discussed. In the case of a properly functioning AGS system (plot 926, solid line) or an AGS system that is stuck in a closed position (plot 930, dash and dot line), no heat signature is detected when the active grille shutters are closed and the engine cooling fan is running in reverse. However, if the AGS system is stuck open (plot 928, dashed line), a heat signature will be detected.

At time t7, the active grille shutters are commanded to open (plot 932). If the AGS system is functioning properly, then a heat signature should be detected (plot 926, solid line) but if the AGS is stuck closed (plot 930, dash and dot line), no heat signature will be detected.

It should be noted that both the AGS closing test, between times t6 and t7, and the AGS opening test, between times t7 and t8, may be performed to determine proper AGS system functionality. In some examples, the AGS closing test between t6 and t7 along with the AGS opening test between t7 and t8 may each be repeated several times in order to obtain a statistically-significant diagnostic result.

At time t8, the AGS diagnostic finishes and the run diagnostic entry condition check switches to the "No" position (plot 924). In addition, the front-facing camera switches out of IR imaging mode and the heat signature detection status switches to the "N/A" position (plot 926), the cooling fan switches to the "off" position (plot 920), and the active grille shutters are commanded to close (plot 932).

In this way, an AGS system may be diagnosed during non-moving vehicle conditions following shutdown of an engine using output from a forward-facing camera of the vehicle that is capable of imaging in the infrared range. The output from the camera may be used to generate heat images of engine heat pushed out of the vehicle by reverse rotation of an engine cooling fan. The heat images may be analyzed to determine if the AGS system shutters are opening and closing as commanded (e.g., based on engine heat being pushed out of the vehicle when the shutters are open and retained in the vehicle when the shutters are closed).

A technical effect of diagnosing the active grille shutter (AGS) system using the engine cooling fan running in reverse to push engine heated out of the front of the vehicle and detecting resultant heat signatures using a front-facing IR camera is that a degraded AGS system may be detected using existing vehicle components and false negative determination of AGS system degradation due to degraded AGS system position sensors may be avoided.

An example provides a method including indicating degradation of an active grille shutter (AGS) system of a vehicle based on infrared image information obtained from a camera coupled to the vehicle, and adjusting an engine system operating parameter responsive to the indicating. In a first example of the method, the method further includes during a non-moving vehicle condition where engine temperature is greater than a threshold, commanding the AGS system to move from a first position to a second position and obtaining the infrared image information upon commanding the AGS system to move from the first position to the second position. In a second example, which optionally includes the first example, indicating degradation comprises estimating a temperature in front of the vehicle based on the infrared image information and indicating degradation responsive to the temperature in front of the vehicle being below a threshold temperature. In a third example, which optionally includes one or both of the first and second examples, the first position includes a fully closed position and the second position includes a fully open position. In a fourth example, which optionally includes one or more or each of the first through third examples, indicating degradation comprises estimating a temperature in front of the vehicle based on the infrared image information and indicating degradation responsive to the temperature in front of the vehicle being above a threshold temperature. In a fifth example, which optionally includes one or more of each of the first through fourth examples, the first position includes an open position and the second position includes a fully closed position. In a sixth example, which optionally includes one or more of each of the first through fifth examples, the method includes operating an engine cooling fan in a reverse direction to push heat from an engine of the vehicle out of the vehicle and toward the camera while obtaining the infrared image information.

Another example provides for a method for a vehicle, comprising during a first condition, adjusting a vehicle operating parameter based on output from a forward-facing camera coupled to a front of the vehicle; and during a second condition and responsive to output from the forward-facing camera indicating a predetermined clearance in front of the vehicle is met, indicating degradation of an active grille shutter (AGS) system based on infrared image information output from the forward-facing camera. In a first example of the method, the first condition comprises vehicle operation with an engine of the vehicle undergoing combustion and wherein the second condition comprises non-moving vehicle conditions with the engine not undergoing combustion. In a second example of the method, which optionally includes the first example, the method further includes, during the second condition and responsive to the output from the forward-facing camera indicating the predetermined clearance in front of the vehicle is met: rotating a cooling fan of the vehicle in a reverse direction; obtaining first infrared image information from the forward-facing camera while the AGS system is in a closed position; and obtaining second infrared image information from the forward-facing camera while the AGS system is in an open position, and wherein indicating degradation of the AGS system based on the infrared image information comprises indicating degradation based on a first temperature estimated from the first infrared image information being within a threshold range of a second temperature estimated from the second infrared image information. In a third example of the method, which optionally includes one or both of the first and second examples, indicating degradation based on the first temperature being within the threshold range of the second temperature comprises: indicating the AGS system is stuck in the closed position responsive to the first temperature and the second temperature being below a first threshold temperature; and indicating the AGS system is stuck in the open position responsive to the first temperature and the second temperature being above a second threshold temperature. In a fourth example of the method, which optionally includes one or more or each of the first through third examples, the method further comprises during the first condition, rotating the cooling fan in a forward direction. In a fifth example of the method, which optionally includes one or more or each of the first through fourth examples, the method further comprises adjusting one or more engine operating parameters responsive to indicating degradation of the AGS system. In a sixth example of the method, which optionally includes one or more or each of the first through fifth examples, adjusting one or more vehicle operating parameters based on output from the forward-facing camera comprises outputting an alert responsive to detection of an obstacle in front of the vehicle, the obstacle detected from the output from the forward-facing camera. In a seventh example, which optionally includes one or more or each of the first through sixth examples, adjusting one or more vehicle operating parameters based on output from the forward-facing camera comprises adjusting one or more vehicle operating parameters based on visible light image information output from the forward-facing camera.

An example provides a system including a camera positioned at a front end of a vehicle; grille shutters positioned at the front end of the vehicle; a motor coupled to the grille shutters and operable to adjust a position of the grille shutters; a cooling fan operable to blow ambient air from a front of the vehicle over an engine of the vehicle when rotated in a forward direction; and a controller with memory storing instructions executable to, during non-moving vehicle conditions and responsive to output from the camera indicating a predetermined clearance in front of the vehicle is met: rotate the cooling fan of the vehicle in a reverse direction; obtain first infrared image information from the camera while motor is commanded to move the grille shutters to a fully closed position; obtain second infrared image information from the camera while motor is commanded to move the grille shutters to a fully open position; and indicate to a vehicle operator degradation of the grille shutters or motor based the first infrared image information and the second infrared image information. In a first example of the system, the instructions are executable to indicate degradation of the grille shutters or motor responsive to a first temperature estimated from the first infrared image information being within a threshold range of a second temperature estimated from the second infrared image information. In a second example, which optionally includes the first example, the instructions are executable to determine that the degradation includes the grille shutters being stuck in a closed position responsive to the first temperature and the second temperature each being below a threshold temperature. In a third example, which optionally includes one or both of the first and second examples, the instructions are executable to determine that the degradation includes the grille shutters being stuck in an open position responsive to the first temperature and the second temperature each being above a threshold temperature. In a fourth example, which optionally includes one or more of each of the first through third examples, the instructions are executable to, during moving vehicle conditions, adjust one or more engine or vehicle operating parameters based on output from the camera.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   indicating degradation of an active grille shutter (AGS) system of a vehicle based on infrared image information obtained from a camera coupled to the vehicle; and
   adjusting an engine system operating parameter responsive to the indicating.

2. The method of claim 1, further comprising, during a non-moving vehicle condition where engine temperature is greater than a threshold, commanding the AGS system to move from a first position to a second position and obtaining the infrared image information responsive to commanding the AGS system to move from the first position to the second position.

3. The method of claim 2, wherein indicating degradation comprises estimating a temperature in front of the vehicle based on the infrared image information and indicating degradation responsive to the temperature in front of the vehicle being below a threshold temperature.

4. The method of claim 3, wherein the first position includes a fully closed position and the second position includes a fully open position, and wherein indicating degradation includes indicating that the AGS system is unable to move to the fully open position.

5. The method of claim 2, wherein indicating degradation comprises estimating a temperature in front of the vehicle based on the infrared image information and indicating degradation responsive to the temperature in front of the vehicle being above a threshold temperature.

6. The method of claim 5, wherein the first position includes an open position and the second position includes a fully closed position, and wherein indicating degradation includes indicating that the AGS system is unable to move to the fully closed position.

7. The method of claim 5, further comprising operating an engine cooling fan in a reverse direction to push heat from an engine of the vehicle out of the vehicle and toward the camera while obtaining the infrared image information.

8. A method for a vehicle, comprising:
   during a first condition, adjusting a command to an active grille shutter (AGS) system based on output from a forward-facing camera coupled to a front of the vehicle; and
   during a second condition and responsive to output from the forward-facing camera indicating a predetermined clearance in front of the vehicle is met, indicating degradation of the AGS system based on infrared image information output from the forward-facing camera.

9. The method of claim 8, wherein the first condition comprises vehicle operation with an engine of the vehicle undergoing combustion and wherein the second condition comprises non-moving vehicle conditions with the engine not undergoing combustion.

10. The method of claim 9, further comprising, during the second condition and responsive to the output from the forward-facing camera indicating the predetermined clearance in front of the vehicle is met:
    rotating a cooling fan of the vehicle in a reverse direction;
    obtaining first infrared image information from the forward-facing camera while the AGS system is in a closed position; and obtaining second infrared image information from the forward-facing camera while the AGS system is in an open position, and
wherein indicating degradation of the AGS system based on the infrared image information comprises indicating degradation based on a first temperature estimated from the first infrared image information being within a threshold range of a second temperature estimated from the second infrared image information.

11. The method of claim 10, wherein indicating degradation based on the first temperature being within the threshold range of the second temperature comprises:
indicating the AGS system is stuck in the closed position responsive to the first temperature and the second temperature being below a first threshold temperature; and
indicating the AGS system is stuck in the open position responsive to the first temperature and the second temperature being above a second threshold temperature.

12. The method of claim 10, further comprising during the first condition, rotating the cooling fan in a forward direction.

13. The method of claim 8, further comprising adjusting one or more engine operating parameters responsive to indicating degradation of the AGS system, wherein the AGS system degradation is degraded AGS system positon sensors.

14. The method of claim 8, further comprising during the first condition, also outputting an alert responsive to detection of an obstacle in front of the vehicle, the obstacle detected from the output from the forward-facing camera.

15. The method of claim 8, further comprising during the first condition, also adjusting one or more vehicle operating parameters based on visible light image information output from the forward-facing camera.

16. A system, comprising:
a camera positioned at a front end of a vehicle;
grille shutters positioned at the front end of the vehicle;
a motor coupled to the grille shutters and operable to adjust a position of the grille shutters;
a cooling fan operable to blow ambient air from a front of the vehicle over an engine of the vehicle when rotated in a forward direction; and
a controller with memory storing instructions executable to, during non-moving vehicle conditions and responsive to output from the camera indicating a predetermined clearance in front of the vehicle is met:
rotate the cooling fan of the vehicle in a reverse direction;
obtain first infrared image information from the camera while the motor is commanded to move the grille shutters to a fully closed position;
obtain second infrared image information from the camera while the motor is commanded to move the grille shutters to a fully open position; and
indicate to a vehicle operator degradation of the grille shutters or the motor based the first infrared image information and the second infrared image information.

17. The system of claim 16, wherein the instructions are executable to indicate degradation of the grille shutters or motor responsive to a first temperature estimated from the first infrared image information being within a threshold range of a second temperature estimated from the second infrared image information.

18. The system of claim 17, wherein the instructions are executable to determine that the degradation includes the grille shutters being stuck in a closed position responsive to the first temperature and the second temperature each being below a threshold temperature.

19. The system of claim 17, wherein the instructions are executable to determine that the degradation includes the grille shutters being stuck in an open position responsive to the first temperature and the second temperature each being above a threshold temperature.

20. The system of claim 16, wherein the instructions are executable to, during moving vehicle conditions, adjust one or more engine or vehicle operating parameters based on output from the camera.

* * * * *